Patented May 19, 1953

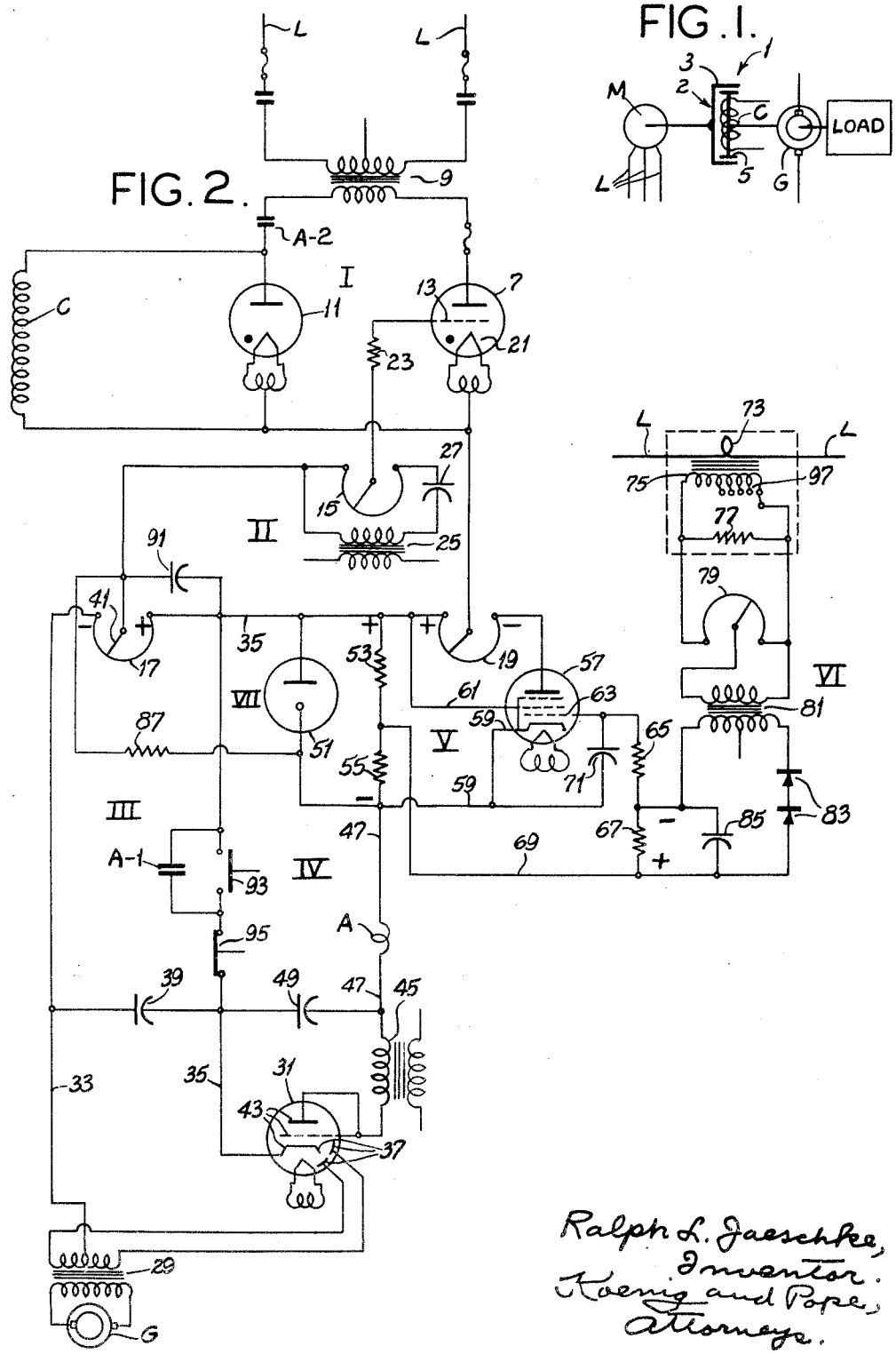

2,639,395

UNITED STATES PATENT OFFICE 2,639,395

CONTROL

Ralph L. Jaeschke, Kenosha, Wis., assignor to Dynamatic Corporation, Kenosha, Wis., a corporation of Delaware Application October 23, 1950, Serial No. 191,520

12 Claims. (Cl. 310—95)

This invention relates to controls, and more particularly, to an electronic control circuit adapted for both speed and torque regulation of dynamoelectric apparatus.

Improved speed control of dynamoelectric apparatus, for example an eddy-current slip coupling, may be obtained from an electronic control. An example of this type of control is shown in the United States Patent No. 2,277,284 issued March 24, 1942 to Anthony Winther for Electrical Governor. It is sometimes desirable to regulate the torque transmitted to a load, or conversely, the torque on a driving device, such as a motor, a common purpose being overload protection during motor starting. A typical torque regulating electronic control is disclosed in the United States Patent Re. 22,432 reissued February 1, 1944, to Anthony Winther for Electrical Control Apparatus. Both speed and torque regulation have been incorporated in a single control; for example, see the United States Patent No. 2,469,706 issued May 10, 1949 to Anthony Winther for Electronic Tension Control Apparatus.

This invention is directed to controls of the last type mentioned above, and provides a relatively simple and inexpensive construction for obtaining these desired operational characteristics. More specifically, the control is adapted to provide speed regulation with protection against excessive torque, or torque regulation with protection against excessive speeds.

Briefly, excitation or energization of the dynamoelectric apparatus is under the immediate control of a power vacuum tube, such as a thyratron. The power tube in turn is controlled by a grid signal which is responsive to conditions of speed and torque. The grid circuit for the power tube has in series adjustable means adapted to supply a speed-responsive bias, adjustable means adapted to supply a torque-responsive bias in voltage opposition to the speed-responsive bias and means providing an A. C. rider. A direct current voltage is also fed into the grid circuit in parallel with and of the same polarity as the speed-responsive bias, this voltage preferably being simultaneously adjustable with the speed-responsive bias. A capacitor is shunted across the adjustable means providing the speed-responsive voltage to prevent rapid changes thereof from being immediately reflected in the thyratron operation. The control additionally includes vacuum tube means, preferably having a sharp cutoff plate current characteristic, for amplifying a torque-responsive voltage before it is fed to the grid circuit of the thyratron, and all constant D. C. voltage requirements are supplied from a single voltage supply circuit. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments is illustrated:

Fig. 1 is a diagrammatic showing of certain dynamoelectric apparatus; and

Fig. 2 is a circuit diagram of the control of this invention.

Similar reference characters indicate corresponding parts throughout the several views of the drawings.

Referring to Fig. 1 of the drawings, there is shown diagrammatically certain dynamoelectric apparatus adapted to drive a load under controlled conditions of speed and torque. An A. C. motor M supplied from power lines L drives the load through an electromagnetic eddy-current slip coupling 2. The coupling consists of an inductor member 3, and a relatively rotary driven field member 5 having a field coil C. The slip between 3 and 5 or speed of the driven field member is controlled by varying the excitation of the field coil C. A small A. C. generator G is mechanically coupled to the driven member 5 and the load, so that its output is a function of the driven speed.

Referring now to Fig. 2 of the drawings, there is shown a half-wave rectifier power circuit I comprising in series a thyratron 7, the secondary of a power transformer 9, a relay switch A-2 and the field coil C of the slip coupling. A back rectifier 11 is shunted across the field coil C to pass inductive discharge of the field coil and smooth out the flow of exciting current. Excitation of the coil is determined by the conductivity of tube 7, which in turn is a function of the grid signal impressed upon the grid 13 of the tube. This grid signal consists of an A. C. rider on a D. C. bias, which bias consists of two components fed in opposition to one another.

The grid circuit II for the thyratron includes a series combination of a first voltage divider 15, a second voltage divider 17, and a third voltage divider 19 with adjustable parts of each connected in series with one another between a cathode 21 of the thyraton and the grid 13 thereof.

A grid-current limiting resistor 23 is series connected in the grid circuit adjacent the grid 13. The A. C. rider of the grid signal is obtained from the first voltage divider 15 by means of a transformer 25 connected in series with a phase-shifting capacitor 27. The A. C. voltage appearing across voltage divider 15 is in fixed out-of-phase relation with the plate voltage of the thyratron supplied at transformer 9, the phase shift being brought about by capacitor 27. It is to be understood that the transformers 9 and 25 are connected to the same supply, such as a conventional 60-cycle A. C. supply.

A D. C. voltage component responsive to the driven speed of the load is supplied by a circuit III and impressed across the second voltage divider 17. The output of the A. C. generator G is fed to a center-tapped transformer 29, rectified at a twin-diode single-triode tube 31 and impressed across conductors 33 and 35. The twin-diode portion 37 of tube 31 is connected with the conductors 33 and 35 and with the center-tapped transformer as a full-wave rectifier so that conductor 35 is positive with respect to conductor 33. Ripple filtering is accomplished by a capacitor 39 connected between the output conductors 33 and 35. The latter conductors are connected across voltage divider 17. An adjusting arm 41 of this voltage divider is connected to the first voltage divider 15.

A D. C. voltage supply circuit IV is included in the control. The triode portion 43 of the tube 31 is operated in conjunction with a power transformer secondary 45 as a half-wave rectifier to supply a constant D. C. voltage across positive conductor 35 and a relatively negative conductor 47. The D. C. output appearing across these two conductors is ripple-filtered by a shunt-connected capacitor 49, regulated by a shunt-connected voltage regulator tube 51 and impressed across a pair of resistors 53 and 55 connected in series with one another. Resistor 53 is connected to the positive conductor 35 and resistor 55 is connected to the negative conductor 47.

Thus, there is provided a constant D. C. voltage across the two series-connected resistors 53 and 55. This voltage serves as a plate supply for a circuit V having a grid-controlled vacuum tube 57 which is in series with the third voltage divider 19. Voltage divider 19 is connected between conductor 35 and the plate of tube 57 as a plate load resistor. A cathode 59 of tube 57 is connected to the negative conductor 47 of voltage supply circuit IV. A screen grid connection is provided at 61 between the resistor 53 and the load voltage divider 19. The grid 63 of this tube is connected through a grid-current limiting resistor 65 to an input resistor 67, the grid circuit being completed by a lead 69 and the resistor 55 to the cathode 59. A capacitor 71 is shunted between the grid 63 and the cathode 59 of tube 57. It will be observed that the resistor 55 supplies a positive D. C. voltage component for the grid signal of the tube 57. A negative component of D. C. voltage is impressed across the input resistor 67 and this component is responsive to the torque transmitted by the slip coupling.

The torque-responsive voltage is obtained from circuit VI having a current transformer with its primary winding 73 connected in series with one of the power lines L supplying the driving motor M. The secondary winding 75 of the transformer is connected across a resistor 77 and a shunt-connected voltage divider 79. A portion of the transformer output voltage is taken off at the voltage divider 79 and fed through a transformer 81, rectified by two series-connected selenium rectifiers 83 and impressed across the input resistor 67. A ripple-filtering capacitor 85 is connected across this resistor.

The voltage appearing across the input resistor 67 is a positive function of the current drawn by the motor M or of the torque transmitted by the coupling 1. Since this voltage tends to drive the grid 63 of tube 57 in a negative direction, the tube conductivity and thereby the voltage across 19 is a negative function of the motor current. It will be observed that resistor 55 supplies a positive component of grid bias for tube 57, and that the net grid bias is the difference between the voltages at 55 and 61.

It will also be noted that a resistor 87 is connected between the negative conductor 47 of the voltage supply circuit IV and the adjusting arm 41 of the second voltage divider 17. A circuit VII is thus provided from the voltage supply circuit IV to the adjustable portion of this voltage divider. The effect of this circuit VII is to feed into the grid circuit of the thyratron 7 a relatively constant D. C. voltage which is simultaneously adjustable with the speed-responsive voltage from circuit III, both voltages being in parallel and of the same polarity.

A capacitor 91 is connected between the adjusting arm 41 of voltage divider 17 and the conductor 35 to dampen the effects on the grid signal of the thyratron resulting from rapid changes in that portion of the grid bias supplied by voltage divider 41. That is, rapid changes in adjustment of the voltage divider are not instantly reflected in the excitation of coil C.

Finally, the control includes a relay push-button network for starting and stopping the control. A coil A of a time-delay relay is connected in the conductor 47 of circuit IV. A normally open start push-button switch 93 and a normally closed stop push-button switch 95 are connected in the conductor 35. A normally open relay switch A-1 shunts the start switch 93 to establish a holding circuit. The time-delay relay A closes its associated switches A-1 and A-2 a predetermined time after energization of the coil. Thus, the plate circuit for the thyratrons is not completed until there is a sufficient elapse of time for the thyratron filament to heat up. The thyratron filaments would necessarily be supplied from the same supply as that for transformers 9, 25 and 45.

Operation is as follows:

First the driving motor M is started and brought up to speed, the driven load remaining stationary since the field coil C of the slip coupling is initially deenergized. The start switch 93 is then actuated and after a predetermined time delay, switches A-1 and A-2 close. After the motor has been started, it draws a relatively small no-load current. A proportionately small negative voltage is impressed across the resistor 67, which voltage is opposed by a positive bias supplied across resistor 55. The grid of tube 51 is driven in a positive direction to provide high tube conductivity and a relatively large voltage across the voltage divider 19, an adjustable part of which is in the grid circuit of the thyratron.

The component of grid bias for the thyratron from 19 is opposed by a second component introduced at the voltage divider 17. Initially, generator G is at standstill and circuit III has a nominal effect upon voltage divider 17. However, a predetermined D. C. voltage is supplied to this voltage divider by circuit VII. The capacitor 85 is initially uncharged, hence the sudden application of voltage at 17 is not immediately reflected across the adjustable part of voltage divider 17. Rather, there is a gradual building up of voltage across the capacitor. Thus, voltage divider 17 supplies a gradually increasing negative component of grid bias for the thyratron.

As the net grid bias of the thyratron 7 moves in a positive or negative direction, the firing angle of the tube as determined by the A. C. component of grid signal is accordingly advanced or retarded. The excitation of the field coil C consequently varies directly with the net grid bias of tube 7. As mentioned above, initially there is a relatively large positive bias component at 19 and a relatively small negative component at 17. This condition causes a relatively positive net grid bias for the thyratron and high excitation of the field coil C. The slip coupling then transmits a higher torque and the motor responds by drawing increased current. As the motor current increases, the voltage at resistor 67 increases to drive the grid of tube 57 in a negative direction. Tube conduction decreases, the voltage at voltage divider 19 decreases, the net bias of the thyratron is reduced and the excitation of the field coil is reduced.

The torque transmitted by the slip coupling is accordingly reduced to protect the motor against overload. At the same time, the capacitor 85 charges and the voltage at 17 increases, causing a further reduction in the net grid bias for the thyratron. Also, as the speed of the generator G builds up, the circuit III causes a further increase in the voltage at 17 and a further decrease in the net grid bias. Ultimately a condition of stability is reached wherein the net grid bias for tube 7 causes the desired torque to be transmitted by the slip coupling.

It is preferred that voltage divider 17 be adjusted to set the maximum speed, this setting being made after voltage divider 19 has been adjusted to supply a maximum bias component. Voltage divider 19 is then employed to vary the speed below this predetermined maximum value.

Preferably, the tube 57 is a sharp cut-off type of tetrode or pentode, hence the net grid voltage must be within a relatively small range during certain conditions of operation. Adjusting taps 97 on the secondary 75 of the current transformer 73, 75 provide for this adjustment of the net grid voltage. Another way of obtaining this adjustment would be by making resistor 55 a voltage divider with the adjusting arm connected to lead 69.

The grid bias of tube 57 should be positive or well above cut-off bias or in saturation during normal operation so that small variation in motor current will not affect the voltage across voltage divider 19. However, if the motor current becomes undesirably large, the grid of tube 57 is driven negative and a relatively small further increase in motor current stops conduction of tube 57. Thus, the control responds sharply to excessive torque, but at the same time provides good speed regulation. Under these conditions of operation, the voltage divider 19 may be considered as supplying a normally substantially constant reference voltage or speed-setting voltage necessary for good speed regulation. However, this reference will automatically change sharply if the load torque exceeds a predetermined value, thus protecting the motor against overload.

The above description of operation applies where it is desired to have speed regulation with protection against a predetermined excessive values of torque. If the control is to be operated primarily as a torque control, as in a tensioning feed, then the grid bias of tube 57 must be negative but above cut-off so that the plate current is a continuous function of the voltage across 67. In this event, the speed regulating features of the control may serve to prevent excessive load speed, as might occur upon failure of the mechanical load. To avoid interference in torque regulation resulting from speed variations, the speed-responsive voltage from circuit III fed into grid circuit II should be less than the constant voltage supplied by circuit VII during normal operation. Circuit III would then be effective only at undesired conditions of high speed when the voltage from circuit III exceeds the voltage from circuit VII. Under these conditions of operation, the voltage divider 17 may be considered as supplying the normally constant reference voltage or torque setting voltage necessary for good torque regulation. However, this normally constant reference will automatically and sharply change if the driven load speed exceeds a predetermined speed, thus protecting the load against excessive speeds. It should be noted that when the control is to be operated primarily for torque regulation, the need for the sharp cut-off tube 57 is not present. In fact, the vacuum tube 57 could be eliminated and the circuit VI connected directly to the voltage divider 19.

Moreover, it will be noted that the performance obtained from the combination of circuits III and VII during torque regulation is essentially the same as that obtained from the combination of circuits V and VI during speed regulation. That is, either combination could be replaced by the other, although the combination of circuits V and VI is necessarily more sensitive than that of circuits III and VII.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A control circuit for dynamoelectric apparatus comprising a grid-controlled vacuum tube controlling excitation of the dynamoelectric apparatus, means providing a first grid signal component responsive to the driven speed of the dynamoelectric apparatus, means providing in parallel with said first grid signal component a second reference grid signal component, and means providing in series opposition with said first and second grid signal components a third grid signal component responsive to the torque transmitted by the dynamoelectric apparatus.

2. A control circuit for dynamoelectric apparatus comprising a grid-controlled vacuum tube controlling excitation of the dynamoelectric apparatus, first means supplying a first grid bias component responsive to one condition of operation of the dynamoelectric apparatus, and second means supplying a second grid bias component in opposition to said first grid bias component and responsive to a second condition of operation of the dynamoelectric apparatus, said second means including a second grid-controlled vacuum tube supplied with a negative grid signal continuously responsive to the second condition of operation of the dynamoelectric apparatus and with a positive grid signal component.

3. A control circuit for dynamoelectric apparatus comprising a grid-controlled vacuum tube controlling excitation of the dynamoelectric apparatus, first means supplying a first grid bias component responsive to the driven speed of the dynamoelectric apparatus, second means supplying a second grid bias component in opposition to said first grid bias component and responsive to the torque transmitted by the dynamoelectric apparatus, said second means including a second grid-controlled vacuum tube supplied with a negative grid signal continuously responsive to the torque transmitted by the dynamoelectric apparatus and with a positive grid signal component.

4. A speed regulating control with overload torque protection for dynamoelectric apparatus, comprising a first grid-controlled vacuum tube controlling excitation of the dynamoelectric apparatus, first voltage means supplying said first tube with a first grid signal component continuously responsive to the driven speed of the dynamoelectric apparatus, second voltage means supplying said first tube with a second grid signal component in voltage opposition to said first grid signal component, said second voltage means comprising a second grid-controlled tube and a plate load resistor connected in the grid circuit of said first tube, third voltage means supplying the second tube with a negative grid signal component continuously responsive to the current drawn by the dynamoelectric apparatus, and fourth voltage means supplying the second tube with a grid signal component in voltage opposition to said other grid signal component.

5. A control as set forth in claim 4, wherein the second tube is a sharp cut-off vacuum tube and wherein the net grid signal therefor is well above the cut-off bias at normal desired speeds of the dynamoelectric apparatus.

6. A control as set forth in claim 4, wherein the plate load resistor for the second tube is a voltage divider, an adjustable part of which is connected in the grid circuit for the first tube.

7. A torque regulating control with high speed protection for dynamoelectric apparatus, comprising a first grid-controlled vacuum tube controlling excitation of the dynamoelectric apparatus, first voltage means supplying said tube with a first grid signal component continuously responsive to the current drawn by the dynamoelectric apparatus, second voltage means supplying the tube with a second grid signal component in voltage opposition to said first grid signal component and continuously responsive to the driven speed of the dynamoelectric apparatus, and third voltage means supplying the tube with a third grid signal component, said third voltage means being connected in parallel with and of the same polarity as said second voltage means.

8. A control for dynamoelectric apparatus, comprising a first grid-controlled vacuum tube controlling excitation of the dynamoelectric apparatus, first voltage means supplying said tube with a first grid signal component continuously responsive to a first condition of operation of the dynamoelectric apparatus, second voltage means supplying the tube with a second grid signal component in voltage opposition to said first grid signal component and continuously responsive to a second condition of operation of the dynamoelectric apparatus, and third voltage means supplying the tube with a third grid signal component, said third voltage means being connected in parallel with and of the same polarity as said second voltage means.

9. A control for dynamoelectric apparatus comprising a primary grid-controlled vacuum tube controlling the excitation of the dynamoelectric apparatus, a circuit controlling the grid signal applied to said primary tube including a first and a second voltage divider having adjustable parts thereof connected in series, a second circuit supplying a D. C. voltage continuously responsive to the driven speed of the dynamoelectric apparatus, said second circuit being connected across the first voltage divider with the positive side of the second circuit connected intermediate the two voltage dividers, a third circuit supplying a relatively constant D. C. voltage having its positive side connected intermediate the two voltage dividers, the negative side of the third circuit being connected to the first voltage divider at a point remote from its positive side, a second grid-controlled vacuum tube having its cathode connected to the negative side of the third circuit and its plate connected to the second voltage divider at a point remote from its positive side, the grid of said second tube being connected through means providing a negative D. C. voltage continuously responsive to the current drawn by the dynamoelectric apparatus and connected to the third circuit at a point intermediate its positive and negative sides.

10. A control circuit adapted to provide for regulation of a first variable condition of dynamoelectric apparatus and to provide an overriding limiting action responsive to a second variable condition of the dynamoelectric apparatus, the control comprising a grid-controlled vacuum tube controlling the excitation of the dynamoelectric apparatus, said grid-controlled vacuum tube having a grid circuit, first voltage means connected in the grid circuit to provide a relatively fixed reference signal, second voltage means connected in the grid circuit in parallel with said first voltage means and providing a limiting signal responsive to said second variable condition, and third voltage means connected in the grid circuit in series opposition with said first and second voltage means and providing a regulating signal responsive to said first variable condition.

11. A control circuit adapted to provide for regulation of a first variable condition of dynamoelectric apparatus and to provide an overriding limiting action responsive to a second variable condition of the dynamoelectric apparatus, the control comprising a grid-controlled vacuum tube controlling the excitation of the dynamoelectric apparatus, said grid-controlled vacuum tube having a grid circuit, first voltage means connected in the grid circuit and providing a regulating signal responsive to said first variable condition, second voltage means connected in the grid circuit in series opposition to said first voltage means and providing a normally substantially constant reference signal, said second voltage means comprising a second grid-controlled vacuum tube having a second grid circuit, said second grid circuit including third voltage means providing a relatively fixed reference signal, and fourth voltage means connected in series opposition with said third voltage means and providing a limiting signal responsive to said second variable condition.

12. A control circuit for controlling two variable conditions of dynamoelectric apparatus and adapted to provide for regulation of either one of said variable conditions and overriding limiting action for the other of said variable conditions, the control circuit comprising a grid-controlled vacuum tube controlling the excitation of the dynamoelectric apparatus, said vacuum tube having a grid circuit, first voltage means connected in said grid circuit and providing a signal responsive to one of said conditions, second voltage means connected in parallel with said first voltage means and providing a relatively fixed reference signal, third voltage means connected in the grid circuit in series opposition with said first and second voltage means, said third voltage means comprising a second grid-controlled vacuum tube having a second grid circuit, said second grid circuit including fourth voltage means providing a relatively fixed reference signal, and fifth voltage means connected in series opposition with the fourth voltage means and providing a signal responsive to said second variable condition.

RALPH L. JAESCHKE.

References Cited in the file of this patent

UNITED STATES PATENTS

| Number | Name | Date |
| --- | --- | --- |
| 2,387,601 | Moyer | Oct. 23, 1945 |
| 2,458,454 | Winther | Jan. 4, 1949 |
| 2,523,047 | Halter | Sept. 19, 1950 |